(12) United States Patent  
Bennett

(10) Patent No.: US 8,405,496 B2
(45) Date of Patent: Mar. 26, 2013

(54) WHEEL WATCHER

(76) Inventor: William Bennett, East Sandwich, MA (US)

( * ) Notice: Subject to any disclaimer, the term of this patent is extended or adjusted under 35 U.S.C. 154(b) by 491 days.

(21) Appl. No.: 12/618,495

(22) Filed: Nov. 13, 2009

(65) Prior Publication Data

US 2011/0115617 A1    May 19, 2011

(51) Int. Cl.
*B60Q 1/00*    (2006.01)
(52) U.S. Cl. ..... 340/439; 340/905; 340/576; 340/573.1; 180/272
(58) Field of Classification Search ........... 340/439, 340/576, 573.1, 905; 180/272
See application file for complete search history.

(56) References Cited

U.S. PATENT DOCUMENTS

| | | | | |
|---|---|---|---|---|
| 4,485,375 | A * | 11/1984 | Hershberger | 340/576 |
| 4,706,072 | A * | 11/1987 | Ikeyama | 340/576 |
| 5,769,085 | A * | 6/1998 | Kawakami et al. | 600/519 |
| 6,218,947 | B1 | 4/2001 | Sutherland | |
| 7,605,693 | B2 * | 10/2009 | Kulas | 340/438 |
| 2002/0105418 | A1 * | 8/2002 | Yurimoto et al. | 340/436 |
| 2002/0173881 | A1 | 11/2002 | Lash | |
| 2003/0096594 | A1 * | 5/2003 | Naboulsi | 455/411 |
| 2005/0087382 | A1 * | 4/2005 | Bellehumeur | 180/272 |
| 2005/0131597 | A1 * | 6/2005 | Raz et al. | 701/29 |
| 2006/0287783 | A1 * | 12/2006 | Walker | 701/29 |
| 2007/0008083 | A1 | 1/2007 | Berg | |
| 2008/0023253 | A1 | 1/2008 | Prost-Fin | |
| 2008/0042856 | A1 | 2/2008 | Power | |
| 2008/0180235 | A1 | 7/2008 | Chang | |
| 2008/0316037 | A1 * | 12/2008 | Shoji et al. | 340/576 |
| 2009/0160631 | A1 | 6/2009 | Galley | |
| 2009/0212974 | A1 * | 8/2009 | Chiba et al. | 340/932.2 |

* cited by examiner

*Primary Examiner* — Daryl Pope
(74) *Attorney, Agent, or Firm* — Kenneth Bower

(57) ABSTRACT

Disclosed is a vehicle driver safety device that serves the purpose of helping and encouraging drivers to drive attentively and with alertness with a degree of vehicle control that adapts to driver experience, vehicle speed and road conditions. Should the unsafe habits persist the system warns nearby cars and officials and records the incidents for review by a parent or mentor to serve as a deterrent. The new and unique wheel watcher utilizes a steering wheel with sensor arrays that determine the number and position of the drivers hands on the wheel, a vehicle speed and road condition sensor to judge the degree of control that is appropriate, a clock/timer to determine the length a unsafe practice persists and a driver identification device that affects the degree of safety practices that are encouraged by the system. An internal alarm is provided to alert the driver to an unsafe condition and indicators such as lights grouped with the sensors alert the driver to the safe positions for their hands that will satisfy the system that the vehicle is under adequate control.

48 Claims, 5 Drawing Sheets

Cross Section "A-A"

Figure 1:
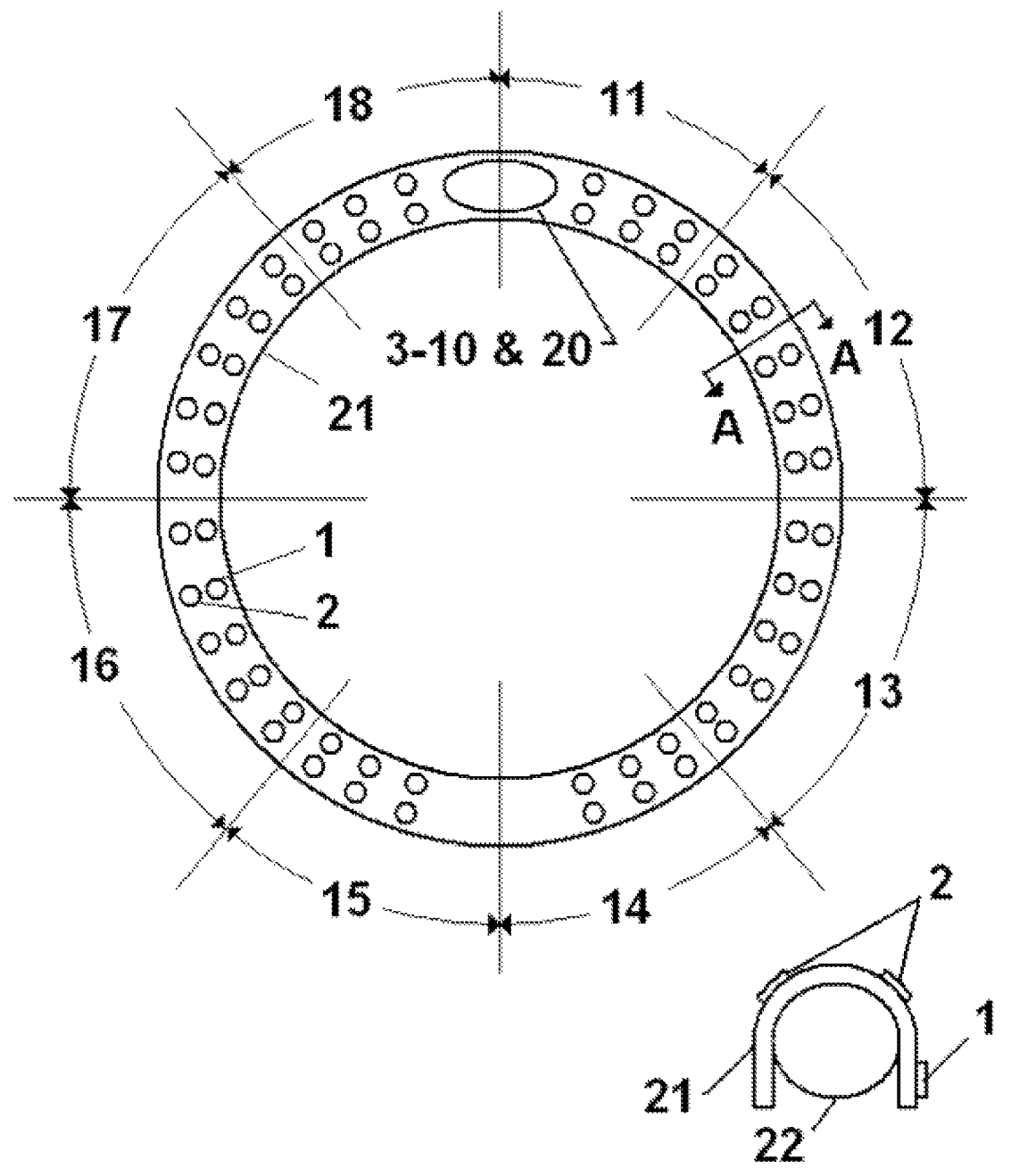

| Novice Driver | 11 | 12 | 13 | 14 | 15 | 16 | 17 | 18 |
|---|---|---|---|---|---|---|---|---|
| Low Speed | X | X | X | X | X | X | X | X |
| High Speed | | | | | | | | |
| Good Road | X | X | | | | | X | X |
| Poor Road | | X | | | | | X | |
| Expert Driver | | | | | | | | |
| Min. Speed | X | X | X | X | X | X | X | X |
| High Speed | | | | | | | | |
| Good Road | X | X | | 1 | 1 | | X | X |
| Poor Road | | X | | | | | X | |
| Long Drive | | X | | 1 | 1 | | X | |

Fig. 4a

| Sensors | Time | System Output |
|---|---|---|
| 1 hand sensed | short | in vehicle alarm |
| 1 hand sensed | long | external alarm |
| 1 hand sensed | long | record incident |
| 1 hand sensed | repeat | record incidents |
| no hands sensed | none | in vehicle alarm |
| no hands sensed | none | record incident |
| no hands sensed | short | external alarm |

Fig. 4b

WHEEL WATCHER

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention represents a significant step forward in the field of vehicle safety. Vehicular safety is a function of the vehicle speed, road conditions, driver experience, driver exerting control, driver alertness, driver distractions and elapsed driving time. The speedometer is the traditional safety indicator for the driver. The steering wheel has been proposed in known technology for use to detect the sobriety or sleepiness of the driver. Known steering wheel systems ignore current opportunities to improve operation by limiting themselves to detecting only a single unsafe driving practice like driving while drowsy. Thus missing additional driver caused unsafe conditions and ignoring the fact that multiple drivers with differing driving habits may drive a single vehicle and that more parties than the driver may be made safer by receiving a indication of the unsafe driving practice. The instant invention contains a unique combination of features that addresses present and future driver caused hazards by utilizing state of the art wireless, sensing and recording technology, programmability and introduces ways of preventing the unsafe condition from occurring in the first place.

2. Description of Related Art

The following art is representative of publications in the field of vehicle driver safety.

The published application patent to Lash et al. (US2002/0173881) discloses a device where the vehicle speed and road conditions are determined through wireless devices including GPS, and a cruise control interface and clock.

Lash et al. lacks, a device that indicates that safe driving principles of attentiveness and lack of fatigue are being practiced based on the positions of two hands on the steering wheel and lacks allowing brief periods of one hand contact, also lacking the nominal two positions are determined by driver experience and are changed as vehicle speed and road conditions change, without an indication of safe positions of the hands, no indication of unsafe conditions are indicated to the driver first but escalate quickly to flashing external lights and/or the horn and there is no recording into the parental control unit nor is there heat/cold or vibration to alleviate driver fatigue and Lash et al. is not packaged as an aftermarket steering wheel cover.

The following is art representative of what is published in the field of vehicle driver safety.

The published application patent to Berg et al. (US2007/0008083) discloses a device that vibrates the steering wheel as an alarm indication to the driver but is not controlled in response to a clock that indicates the driver could use the increased circulation in the hands and arms to relieve fatigue.

Berg et al. lacks, a device that indicates that safe driving principles of attentiveness and lack of fatigue are being practiced based on the positions of two hands on the steering wheel nor does Berg et al. allowing brief periods of one hand contact, the nominal two positions are not determined by driver experience and are also not changed as vehicle speed and road conditions change, there is no indication of safe positions of the hands, nor is the vehicle speed and road conditions are determined through wireless devices including GPS, absent is an indication of unsafe conditions are indicated to the driver first but escalate quickly to flashing external lights and/or the horn and recording into the parental control unit Berg also lacks, heat/cold or vibration to alleviate driver fatigue nor is it packaged as an aftermarket steering wheel cover.

The published application patent to Prost-Fin et al. (US2008/0023253) discloses a device that incorporates cruise controls into the steering wheel of a vehicle.

Prost-Fin et al. Lacks, a device that indicates that safe driving principles of attentiveness and lack of fatigue are being practiced based on the positions of two hands on the steering wheel, nor does it allow brief periods of one hand contact, missing is the nominal two positions are determined by driver experience nor are they changed as vehicle speed and road conditions change, there is no indication of safe positions of the hands, the vehicle speed and road conditions are not determined through wireless devices including GPS, indication of unsafe conditions are not indicated to the driver first and do not escalate quickly to flashing external lights and/or the horn and recording into the parental control unit and are also missing a heat/cold or vibration to alleviate driver fatigue nor is the system packaged as an aftermarket steering wheel cover.

The published application to Power (US2008/0042856) discloses a device that indicates that safe driving principles of attentiveness and lack of fatigue are being practiced based on the grip pressure of the hands on the steering wheel, with vibration of the steering wheel as an alarm to awaken the driver.

Power lacks, a device that indicates that safe driving principles of attentiveness and lack of fatigue are being practiced based on the positions of two hands on the steering wheel, it does not allow brief periods of one hand contact, the nominal two positions are not determined by driver experience and are not changed as vehicle speed and road conditions change, no indication of safe positions of the hands, the vehicle speed and road conditions are not determined through wireless devices including GPS, indication of unsafe conditions are not indicated to the driver first but escalate quickly to flashing external lights and/or the horn and there is no recording into the parental control unit nor is there heat/cold or vibration to alleviate driver fatigue and the system is not packaged as an aftermarket steering wheel cover.

The published application patent to Chang (US2008/0180235) discloses a device that indicates that safe driving principles of attentiveness and lack of fatigue are being practiced by using heat or cold to influence the core body temperature of the drive.

Chang Lacks, a device that indicates that safe driving principles of attentiveness and lack of fatigue are being practiced based on the positions of two hands on the steering wheel, it does not brief periods of one hand contact, the nominal two positions are not determined by driver experience and are not changed as vehicle speed and road conditions change, an indication of safe positions of the hands, the vehicle speed and road conditions are not determined through wireless devices including GPS, indication of unsafe conditions are not indicated to the driver first but escalate quickly to flashing external lights and/or the horn and recording into the parental control unit and nothing is provided such as vibration to alleviate driver fatigue and packaged as an aftermarket steering wheel cover.

The published application patent to Galley et al. (US2009/0160631) discloses a device that indicates that safe driving principles of attentiveness as a function of a driver parameter Galley et al. lacks, a device that indicates that safe driving principles of attentiveness and lack of fatigue are being practiced based on the positions of two hands on the steering wheel, it does not allow brief periods of one hand contact, the nominal two positions are not determined by driver experience and are not changed as vehicle speed and road conditions change, nor an indication of safe positions of the hands, the vehicle speed and road conditions are not determined through wireless devices including GPS, indication of unsafe conditions are not indicated to the driver first nor do they escalate quickly to flashing external lights and/or the horn and is also lacking recording into the parental control unit as well as no heat/cold or vibration to alleviate driver fatigue and the system is not packaged as an aftermarket steering wheel cover.

The published application patent to Sutherland (U.S. Pat. No. 6,218,947) discloses a device that indicates that safe driving principles of lack of fatigue are being practiced based on the contact of the hands on the steering wheel.

Sutherland, lacks, a device that indicates that safe driving principles of attentiveness and lack of fatigue are being practiced based on the positions of two hands on the steering wheel, it does not allow brief periods of one hand contact, the nominal two positions are not determined by driver experience and are not changed as vehicle speed and road conditions change, also lacking is an indication of safe positions of the hands, the vehicle speed and road conditions are not determined through wireless devices including GPS, indication of unsafe conditions are not indicated to the driver first nor do they escalate quickly to flashing external lights and/or the horn and there is also no recording into the parental control unit lacking is also heat/cold or vibration to alleviate driver fatigue and the system is not packaged as an aftermarket steering wheel cover.

None of the above Patents or Published Patent Applications singly or in combination is seen to describe the present invention as claimed.

BRIEF SUMMARY OF THE INVENTION

The present invention is a driver safety system for vehicles. Generally, the instant invention solves the problem of texting and other driver distractions, driver control, driver alertness, driver fatigue as a function of driver experience, vehicle speed and road conditions. In addition to solving these problems added features that alert parents, drivers of nearby vehicles and authorities as well as alleviating driver discomfort and fatigue are also provided.

The preferred embodiment of the present invention provides additional unique features by use of GPS for determining vehicle speed, controlling the drivers hand positions depending on vehicle speed, driver experience and road conditions, providing gloves to facilitate sensing hand position when contact conductive sensors are used on the steering wheel and other features that will become apparent in the body of the specification and claims of this patent application.

The primary objective of the present invention is to provide the driver with an indication that safe driving principles are being broken.

An objective of the present invention is to sense the position of two hands on the steering wheel as a measure of practicing safe driving practices.

A further objective of the present invention is to detect and indicate driver inattentiveness or fatigue, A further objective of the present invention is to allow brief periods of single hand on the steering wheel for changing of hand position the time period being a function of driver experience, vehicle speed and road conditions.

A further objective of the present invention is to change the positions for the two hands to what are considered safe practices as the vehicle speed and driving conditions change.

A further objective of the present invention is to receive speed and road condition information over wireless sources including GPS and automatically react to changes in speed or driving conditions.

A further objective of the present invention is to identify the driver and set the criteria for safe driving practices based on driver experience level.

A further objective of the present invention is to escalate the indication that unsafe driving practices are in practice by flashing external lights or the horn to warn nearby drivers and attract the attention of authorities.

A further objective of the present invention is to further discourage the practice of unsafe driving principles by recording occurrences for parental, owner or rental agency review.

Still a further objective of the present invention is to change what are considered safe practices depending on the experience of the driver and the elapsed driving time since the driver has had a break.

A further objective of the present invention is to alert the driver of the positions to hold the steering wheel that are considered safe at the current driving speed and road conditions.

Still a further objective of the present invention is to alleviate driver fatigue or discomfort by physical changes in the steering wheel.

A final objective of the current invention is to provide a system meeting all of the aforementioned objectives in an aftermarket, steering wheel cover.

BRIEF DESCRIPTION OF THE SEVERAL VIEWS OF THE DRAWING(S)

FIG. 1: is a frontal view of the preferred embodiment of the present invention.

Figure 2:
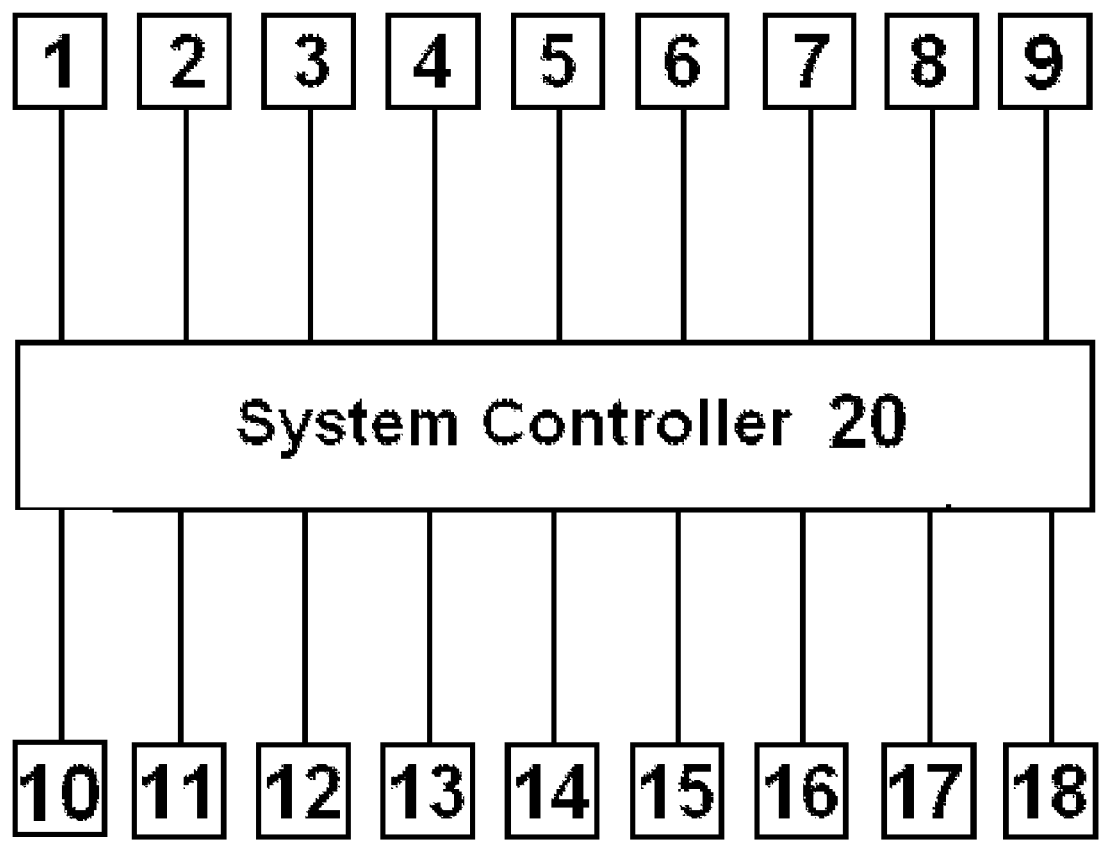

FIG. 2: is a block diagram of the system controls for the preferred embodiment of the present invention.

Figure 3:
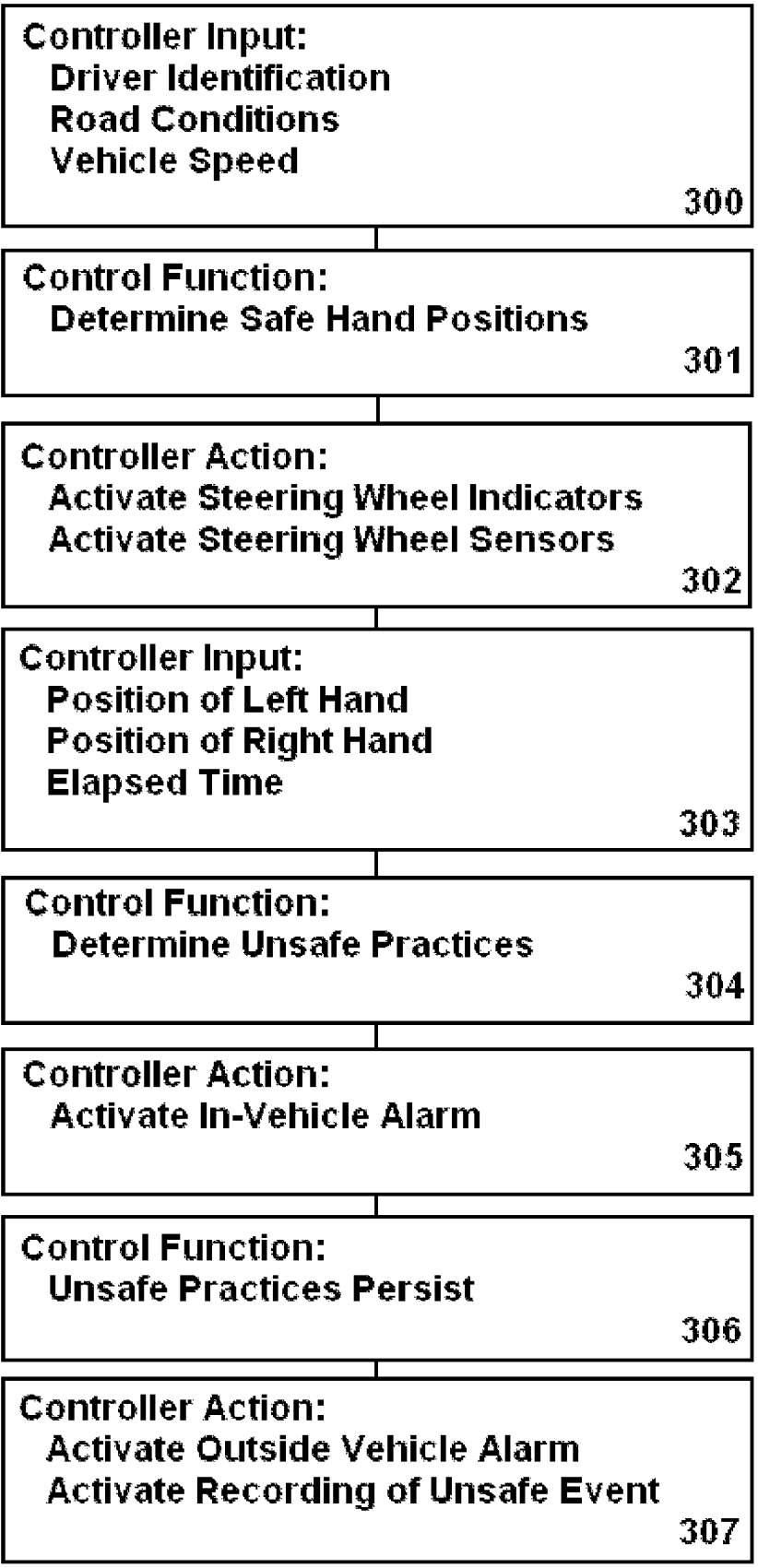

FIG. 3: is a block diagram of controller Input, control functions and controller actions or outputs.

FIG. 4*a*: is a table of hand positions considered safe as a function of controller inputs.

FIG. 4*b*: is a table of controller outputs as a function of drivers being absent from the steering wheel segments considered safe.

Figure 5:
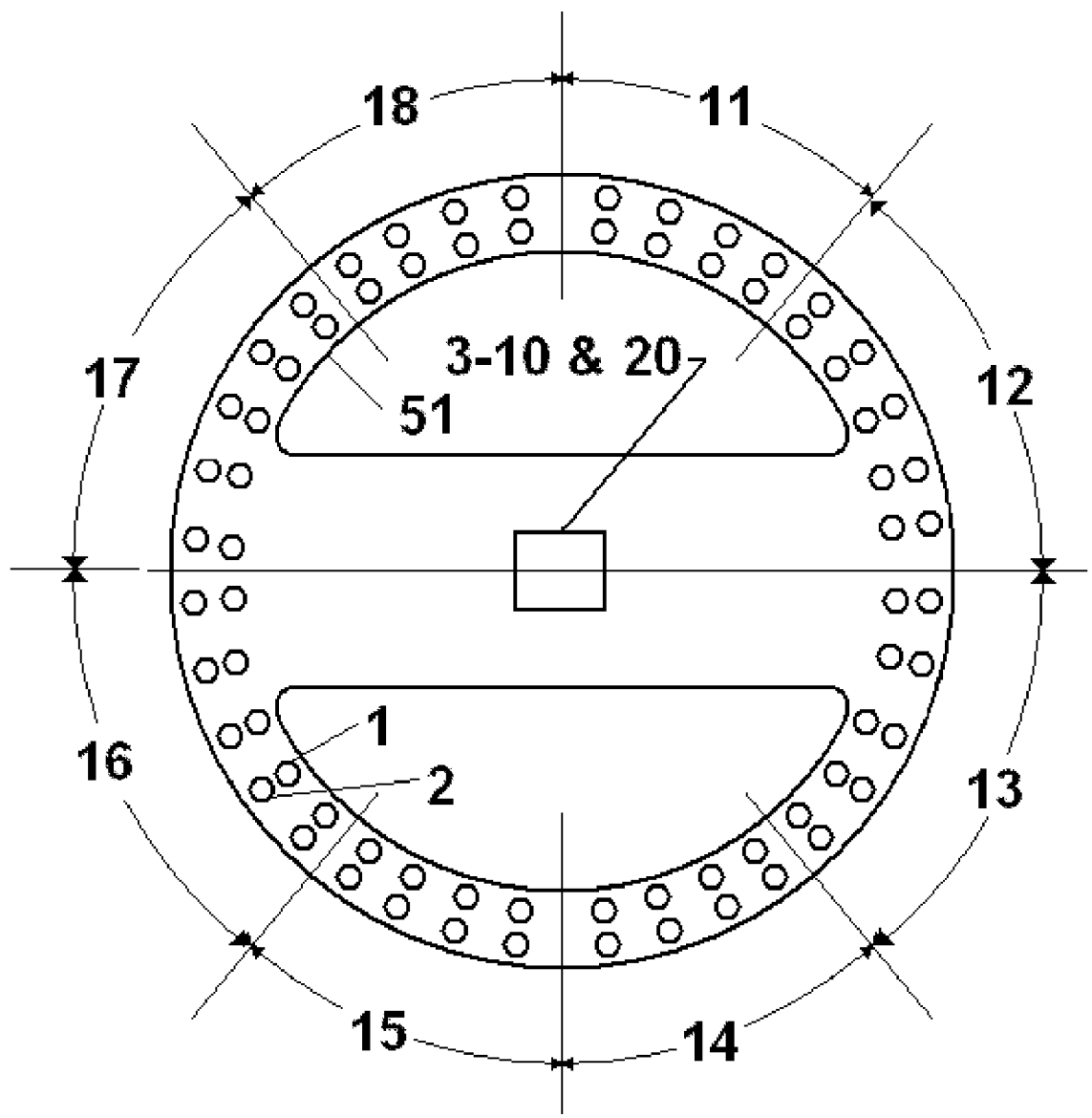

FIG. 5: is a frontal view of a second embodiment of the present invention.

DETAILED DESCRIPTION OF THE INVENTION

FIG. 1 The preferred embodiment of the present invention is packaged to be sold as an after-market accessory for installation on the steering wheel of a vehicle after manufacture. Before installation the accessory 21 has the outer appearance of a bicycle tire with a "U" shaped radial cross section See Cross section "A-A". The accessory 21 is made of pliable material and slips over the outer periphery of the steering wheel 22. After the accessory 21 is mounted simple electrical connections are made to the vehicle power (un-shown), headlights (un-shown) and horn (un-shown) completes the installation. Steering wheel indicators 1 which are envisioned as LEDs, but could be any equivalent lighting device, show the driver the sector 11-18 of the steering wheel where the driver should grasp the steering wheel. Steering wheel sensors 2 detect the presence of the drivers hand (un-shown). The cross section "A-A" shows two steering wheel sensors 2 as the preferred embodiment uses the conductivity of the drivers hand to complete a circuit between at least two contact points to determine hand position. Conductive gloves are also potentially useful to operate the steering wheel sensors during cold weather. The steering wheel sensors in each individual sector are connected in parallel to the system controller 20. A wheel watcher system would have a minimum of one sector on each side of the center line of the attachment 21. However, for purposes of this example the attachment 21 has four sectors 11-14 and 15-18 on either side of the center line of the attachment 21. The remainder of the system components are located in a small compartment 23 at the top center of the attachment 21.

FIG. 2. Is a system block diagram of the wheel watcher system of the preferred or second embodiment. The system components include a driver ID device 3 which can be a simple keypad, card reader or RFID device containing a password that identifies the driver. A vehicle speed determining device 4 is preferably a GPS that is so equipped but can be any device that measures or otherwise determines the vehicle speed. A clock/timer 5 is positioned for ease of the driver reading the time without taking his eyes from the road. The timer feature of the clock/timer 5 measures elapsed time under the control of the system controller 20 as will be explained later. A road condition determining device is preferably a wireless device that correlates GPS position of the vehicle with the weather map and reports the results wirelessly to the vehicle but may be as simple as an air temperature thermometer (un-shown) and precipitation sensor (un-shown) in the vehicle. The recorder 7 keeps a record of the unsafe driving incidents by a driver for review by a parent, rental agent or mentor of the driver after a period of driving the vehicle. The recorder 7 can be a magnetic card, flash memory or wireless Internet connection. The internal alarm 8 can be an audible or visible indicator to the driver that an unsafe driving practice is in progress. The external alarm 9 could be a separate light or sound making device outside of the car but for simplicity could be a flashing of the headlights and or horn to let drivers of nearby vehicles or the authorities know that an unsafe driving practice is taking place. Lastly the system components can include a driver comfort apparatus 10 comprising a vibrator or warmer for the comfort of the drivers hands especially on long trips. The driver comfort apparatus could be placed under system control based on the duration of a trip or be manually activated by the driver.

FIG. 3 shows a block diagram of the function of the system controller 20. The system controller 20 receives inputs identifying the driver, condition of the road and vehicle speed at step 300. From the three inputs at step 300 the controller 20 determines the hand positions of the driver assuring safe operation of the vehicle at step 301. At step 302 the controller activates the steering wheel indicators 1 that tell the driver where the best hand positions are located for safe driving practices and activates input from the corresponding steering wheel sensors 2. The controller 20 then looks for input from the left hand steering wheel sensors 2 at sectors 15-18 and the right hand steering wheel sensors 2 at sectors 11-14 as well as the clock/timer 5 to determine elapsed time at step 303. At step 304 the controller 20 determines that an unsafe practice is in progress the timer 5 is started and after a pre-set period passes, the in-vehicle alarm 8 is activated at step 305. Should the unsafe condition persist for a second pre-set period at step 306 the controller activates the external vehicle alarm 9 in the form of flashing headlights or blowing of the horn at step 307.

FIG. 4a is a table showing a preferred set of criteria the system controller 20 uses to determine which steering wheel indicators 1 and steering wheel sensors 2 to activate. The table is broken into two major sections marked Novice Driver and Expert driver. With both expert and novice drivers all of the sensors 1 and indicators 2 are activated when the vehicle is moving at below a pre-determined low speed. However, the range of hand positions that is activated is reduced at a higher pre-determined speed and reduced further depending on good road or poor road conditions. The same is true of the expert driver except that the expert driver is given more leeway to rest one hand in sectors 14 or 15 on a good road or during a long drive.

FIG. 4b is a table of the system controller 20 responses to unsafe driving practices indicated by exceptions to keeping the drivers hands in the indicated steering wheel sectors 11-18. The first line of the table shows that is only one hand is sensed for a short time that the driver will be reminded by an in car alarm. If only one hand is sensed by the activated steering wheel sensor 2 an external alarm which could include flashing the headlights or blowing the horn externally to warn nearby drivers or authorities of unsafe driving practices. A recorder 7 may also be included so that a drivers parent or mentor is aware that unsafe practices are resulting in external alarms and placing the driver and passengers in danger. The absence of any hands on the steering wheel 1 while the vehicle is moving results in immediate activation of the internal alarm 8, external alarm 9 and recorder 7.

The second embodiment of the present invention of FIG. 5 is a small modification of the preferred embodiment shown in FIG. 1 with like features numbered identically. The second embodiment of the wheel watcher would be manufactured into the steering wheel at the factory. The primary difference is that the system controller and system components would be located in a larger cavity in the steering wheel hub. The operation of the system shown in FIGS. 2-4. is identical for the second embodiment of the present invention as it is for the preferred embodiment.

Although the terms and definitions used in the specification are intended to be read into the claims they are hot intended to limit the meets and bounds of the claims presented here below in any manner whatsoever.

I claim:
1. A vehicle having a steering wheel watcher system, comprising:
   a plurality of steering wheel sensors for detecting a presence of a driver hands;
   wherein the plurality of steering wheel sensors are arranged in two or more groups;
   wherein a first group of steering wheel sensors is located to a left of a vertical center line of the steering wheel;
   wherein a second group of steering wheel sensors is located to a right of the vertical center line of the steering wheel;
   one or more vehicle speed detectors;
   an in vehicle alarm for alerting the driver of an unsafe driving condition;
   a timer for determining an elapsed time;
   a control system;

wherein the control system is connected to the plurality of steering wheel sensors, the one or more vehicle speed detectors, the timer and the in vehicle alarm;

wherein the control system does nothing in response to an output from the plurality of steering wheel sensors when the one or more vehicle speed detectors indicates a vehicle speed below a first preset speed;

wherein the control system starts the timer when the vehicle speed is traveling above a second preset speed and only one of the first group of steering wheel sensors or second group of steering wheel sensors indicates the presence of the drivers hands and sounds the in vehicle alarm when the timer reaches a predetermined elapsed time;

a hand comfort device for providing comfort to the driver;

wherein the hand comfort device is a hand warmer or;

wherein the hand comfort device is a vibrator;

wherein the system controller activates the hand comfort device based on a trip history.

2. The system of claim 1, wherein:
the control system activates the in vehicle alarm and external alarm when the vehicle is moving and none of the groups of steering wheel sensors indicates hand presence.

3. The system of claim 1, wherein:
the plurality of steering wheel sensors detects the electrical conductivity of the drivers hands.

4. The system of claim 3, further comprising:
one or more conductive gloves for covering one or more hands of the driver for having an electrical conductivity similar to the electrical conductivity of the drivers hands.

5. The system of claim 1, wherein:
the vehicle speed detector is a wireless device.

6. The system of claim 5, wherein:
the vehicle speed detector is a GPS.

7. The system of claim 1, wherein:
the system control activates the in vehicle alarm at or above a preset speed.

8. The system of claim 1, further comprising:
a driver identification device;
wherein the system controller alters at least one of a hand positions considered safe, preset period of time, internal alarm external alarm or data recording based on the driver identification.

9. The system of claim 8, wherein:
the driver identification device is a key pad for input of a password.

10. The system of claim 1, further comprising:
a data recording and output device for keeping a record of alarm activations;
wherein the data recording and output device keeps a record of at least one of driver identification the internal alarms, repeated internal alarms and external alarms or vehicle speed and road conditions of the wheel watcher system.

11. The system of claim 1, further comprising:
an external vehicle alarm for indicating an unsafe driving condition outside of the vehicle;
wherein the control system activates the external vehicle alarm when only one group of steering wheel sensors senses the presence of a hand for a predetermined period of time at or above a preset speed or no groups of steering wheel sensors senses the presence of hands above a speed of zero.

12. The system of claim 1, further comprising:
one or more active steering wheel sensor group indicators;
wherein the one or more active steering wheel sensor group indicators is located on the steering wheel in the proximity of a active steering wheel sensor group to inform the driver of the position of the hands on the steering wheel that will avoid activation of the alarms or alarm recording.

13. The system of claim 1, further comprising:
a road condition detector;
wherein the road condition detector is a wireless device;
wherein the system controller alters at least one of a hand positions considered safe, preset period of time, internal alarm external alarm of data recording based on the road conditions.

14. The system of claim 1, further comprising:
a hand comfort device for providing comfort to the driver;
wherein the hand comfort device is a hand warmer;
wherein the hand comfort device is a vibrator;
wherein the system controller activates the hand comfort device based on the driver identification or a trip history.

15. The system of claim 1, further comprising:
a cruise control cluster of driver inputs and indicators.

16. The system of claim 1, further comprising:
a clock positioned for ease of driver observation.

17. The system of claim 1, further comprising:
a wheel watcher system housing that is attachable to an existing steering wheel.

18. A method of operating a wheel watcher system for a vehicle comprising the steps:
supplying one or more vehicle speed determining devices;
supplying one or more steering wheel sensors for a drivers left hand position;
supplying one or more steering wheel sensors for a drivers right hand position;
supplying a elapsed time determining device;
supplying an alarm inside of the vehicle;
activating the alarm when a pre-set time elapses while the vehicle is traveling above a pre-set speed without the steering wheel sensors for a drivers left hand and a steering wheel sensor for a drivers right hand are both activated.

19. The method of claim 18 further comprising the step:
Supplying a road condition determining device;
altering any of the pre-set time, pre-set speed, steering wheel sensors for a drivers left hand or the steering wheel sensors for the drivers right hand in response to a change in the road conditions.

20. The method of claim 18 further comprising the step:
Supplying a driver identification determining device;
altering any of the pre-set time, pre-set speed, steering wheel sensors for a drivers left hand or the steering wheel sensors for the drivers right hand in response to a change in the driver identification.

21. The system of claim 1, wherein:
one of the one or more vehicle speed detectors is a Global Positioning System;
the Global Positioning System activates the four or more steering wheel sensors above the preset speed.

22. The system of claim 1, wherein:
a driver ID device;
wherein the control system sounds the audible in vehicle alarm signaling to the driver that the hands are to be repositioned to another of the four or more sectors based upon sensing of an unsafe driving condition and considering the experience level of the driver input from the driver ID device.

23. The system of claim 1, wherein:
the driver ID device is a keypad;
wherein changes in ID information of the driver requires a password.

24. The system of claim 1, further comprising:
a data recording device that keeps a record of unsafe driving incidents for a later review.

25. The system of claim 1, further comprising:
an output device that communicates unsafe driving incidents for a review performed either locally or remotely.

26. The system of claim 1, further comprising:
indicators communicating to the driver a safe position for the drivers hands;
wherein the safe position of the drivers hands is indicated by an indicator in the on condition.

27. The system of claim 26, wherein:
the indicators are LEDs.

28. The system of claim 1, wherein:
the plurality of sensors are located in a steering wheel cover or integrated into the steering wheel.

29. A steering wheel watcher system, comprising:
four or more steering wheel sensors for detecting a presence of a hand of a driver;
wherein each of the four or more steering wheel sensor is located in a unique position around a periphery of a steering wheel;
wherein each of the four or more steering wheel sensors is individually accessible for activation by each of the hands of the driver;
wherein the four or more steering wheel sensors are located in four or more sectors of the periphery of the steering wheel;
wherein a left half of the four or more sectors are located to a left of a vertical center line of the steering wheel;
wherein a right half of the four or more sectors are located to a right of the vertical center line of the steering wheel;
one or more vehicle speed detectors;
an audible in vehicle alarm for alerting the driver of an unsafe driving condition;
a timer for determining an elapsed time;
a control system;
wherein the control system is connected to at least one of the four or more steering wheel sensors in each of the four or more sectors, one or more vehicle speed detectors, the timer and the audible in vehicle alarm;
wherein the control system is quiescent in response to an output from the four or more steering wheel sensors when one or more of the one or more speed detectors indicates a vehicle speed below a first preset speed;
wherein the control system sounds the audible in vehicle alarm immediately when one of the one or more vehicle speed detectors indicates a vehicle speed above the first preset speed and none of the four or more steering wheel sensors in the first of the four or more or second of the four or more sectors indicates the presence of a hand of a driver;
wherein the control system sounds the audible in vehicle alarm when the timer reaches a preset time after the one or more vehicle speed detectors indicates a vehicle speed above the second preset speed and there is a lack of a steering wheel sensor output from the left half of the four or more sectors of four or more steering wheel sensors or the right half of the four or more sectors of four or more steering wheel sensors.

30. The system of claim 29, wherein:
one of the one or more vehicle speed detectors is a Global Positioning System;
the Global Positioning System activates the four or more steering wheel sensors above the preset speed.

31. The system of claim 29, wherein:
a driver ID device;
wherein the control system sounds the audible in vehicle alarm signaling to the driver that the hands are to be repositioned to another of the four or more sectors based upon sensing of an unsafe driving condition and considering the experience level of the driver input from the driver ID device.

32. The system of claim 29, wherein:
the driver ID device is a keypad;
wherein changes in ID information of the driver requires a password.

33. The system of claim 29, further comprising:
a data recording device that keeps a record of an unsafe driving incidents for a later review.

34. The system of claim 29, further comprising:
an output device that communicates unsafe driving incidents for a review done locally or remotely.

35. The system of claim 29, further comprising:
an outside vehicle alarm.

36. The system of claim 29, wherein:
indicators communicating to the driver a safe position for the drivers hands;
wherein the safe position of the drivers hands is indicated by an indicator in the on condition.

37. The system of claim 36, wherein:
the indicators are LEDs

38. The system of claim 29, wherein:
the plurality of sensors are located in a steering wheel cover or integrated into the steering wheel.

39. The system of claim 29, further comprising:
a driver ID device;
wherein the control system activates the one or more steering wheel indicators located within a designated of the four or more sectors based upon sensing an unsafe driving condition and a driver experience level from the driver ID device.

40. The system of claim 39, further comprising:
one or more steering wheel indicators located within each of the four or more sectors of the periphery of the steering wheel;
wherein the control system activates the one or more steering wheel indicators located within designated of the four or more sectors based upon sensing an unsafe driving condition and a driver experience level from the driver ID device.

41. The system of claim 39, wherein:
one of the one or more vehicle speed detectors is a Global Positioning System;
the Global Positioning System activates the four or more steering wheel sensors above the first preset speed.

42. The system of claim 39, wherein:
the control system sounds the audible in vehicle alarm signaling to the driver that the hands are to be repositioned to another of the four or more sectors based upon sensing of an unsafe driving condition and considering the experience level of the driver input from the driver ID device.

43. The system of claim 39, wherein:
the driver ID device is a keypad
wherein changes in ID information of the driver requires a password.

44. The system of claim 39, further comprising:
a data recording device that keeps a record of an unsafe driving incidents for a later review.

45. The system of claim 39, further comprising:
an output device that communicates an unsafe driving incidents for a review performed locally or remotely.

46. The system of claim 39, further comprising:
an outside vehicle alarm.

47. The system of claim 39, wherein:
the indicators are LEDs.

48. The system of claim 39, wherein:
the plurality of sensors are located in a steering wheel cover or integrated into the steering wheel.

\* \* \* \* \*